United States Patent
Kamio

(10) Patent No.: US 11,787,293 B2
(45) Date of Patent: Oct. 17, 2023

(54) ELECTRIC MOTOR CONTROL DEVICE AND METHOD OF ELECTRIC MOTOR CONTROL

(71) Applicant: DENSO CORPORATION, Kariya (JP)

(72) Inventor: Shigeru Kamio, Kariya (JP)

(73) Assignee: DENSO CORPORATION, Kariya (JP)

( * ) Notice: Subject to any disclaimer, the term of this patent is extended or adjusted under 35 U.S.C. 154(b) by 6 days.

(21) Appl. No.: 17/464,332

(22) Filed: Sep. 1, 2021

(65) Prior Publication Data
US 2021/0394621 A1    Dec. 23, 2021

Related U.S. Application Data

(63) Continuation of application No. PCT/JP2020/008928, filed on Mar. 3, 2020.

(30) Foreign Application Priority Data

Mar. 11, 2019 (JP) ................. 2019-043263

(51) Int. Cl.
H02P 5/46 (2006.01)
B60L 15/20 (2006.01)
B60L 3/00 (2019.01)

(52) U.S. Cl.
CPC .............. B60L 15/20 (2013.01); B60L 3/00 (2013.01); H02P 5/46 (2013.01); *H02P 2205/05* (2013.01)

(58) Field of Classification Search
CPC ........ B60L 15/20; B60L 3/00; B60L 2220/46; H02P 5/46; H02P 2205/05
See application file for complete search history.

(56) References Cited

U.S. PATENT DOCUMENTS 5,481,460 A * 1/1996 Masaki .................. B60L 3/102
318/587
8,680,808 B2 * 3/2014 Mukai .................. H02P 29/032
318/722

(Continued)

FOREIGN PATENT DOCUMENTS

JP     H10-289020 A    10/1998
JP     2016-52164 A     4/2016

(Continued)

OTHER PUBLICATIONS

Jun. 2, 2020 International Search Report issued in International Patent Application No. PCT/JP2020/008928.

*Primary Examiner* — Rina I Duda
(74) *Attorney, Agent, or Firm* — Oliff PLC

(57) ABSTRACT

An electric motor control device includes a target torque setting unit setting target torque for each of a right-side control circuit and a left-side control circuit, and a failure occurrence determination unit determining whether there is a failure occurrence in at least one of the two control circuits. The target torque setting unit sets, in response to there being a failure occurrence in a failure control circuit that is one of the two control circuits and there being a no failure occurrence in a normal control circuit that is the other of the two control circuits, fail-safe torque which is lower than a normal value of the target torque as the target torque for the failure control circuit, and sets failure-time target torque which is lower than the normal value of the target torque and being higher than the fail-safe torque as the target torque for the normal control circuit.

11 Claims, 7 Drawing Sheets

(56) References Cited

U.S. PATENT DOCUMENTS

| | | | | |
|---|---|---|---|---|
| 2013/0320905 A1* | 12/2013 | Uryu | ............... | H02K 11/20 318/490 |
| 2015/0353128 A1* | 12/2015 | Shibuya | ............. | B62D 5/001 701/41 |
| 2016/0006388 A1* | 1/2016 | Masuda | ............. | H02P 27/08 318/51 |
| 2017/0272009 A1* | 9/2017 | Kawamura | ......... | B60L 3/0046 |

FOREIGN PATENT DOCUMENTS

| | | |
|---|---|---|
| JP | 2016-086522 A | 5/2016 |
| JP | 2016-147585 A | 8/2016 |

\* cited by examiner

THIRD EMBODIMENT

ELECTRIC MOTOR CONTROL DEVICE AND METHOD OF ELECTRIC MOTOR CONTROL

CROSS-REFERENCE TO RELATED APPLICATION

The present application is a continuation application of International Application No. PCT/JP2020/008928, filed on Mar. 3, 2020, which claims priority to Japanese Patent Application No. 2019-043263, filed on Mar. 11, 2019. The contents of these applications are incorporated herein by reference in their entirety.

BACKGROUND

Technical Field

The present disclosure relates to control of electric motors that drive the road wheels of a vehicle.

Background Technology

Technology is known in which a microcontroller serves as a control unit that controls actuators installed in the vehicle, and a microcontroller monitoring unit monitors for occurrence of abnormality in the microcontroller, wherein fail-safe operation is executed when an abnormality has occurred in the microcontroller monitoring unit. In recent years, a technique (known as in-wheel electric motors) has been proposed in which electric motors are disposed as actuators on left-side and right-side wheels of a vehicle, driving the left-side and right-side wheels respectively. With such a technique, two control circuits may be used as controllers for controlling the left-side and right-side electric motors respectively.

SUMMARY

In the present disclosure, provided is an electric motor control device as the following.

The electric motor control device includes a target torque setting unit configured to set target torque for each of a right-side control circuit and a left-side control circuit, and a failure occurrence determination unit configured to determine whether there is a failure occurrence in at least one of the right-side control circuit and the left-side control circuit. The target torque setting unit is configured to: set, in response to the failure occurrence determination unit determining that there is a failure occurrence in a failure control circuit that is one of the right-side control circuit and the left-side control circuit and there is a no failure occurrence in a normal control circuit that is the other of the right-side control circuit and the left-side control circuit, fail-safe torque as the target torque for the failure control circuit, the fail-safe torque being lower than a normal value of the target torque, and set failure-time target torque as the target torque for the normal control circuit, the failure-time target torque being lower than the normal value of the target torque and being higher than the fail-safe torque.

BRIEF DESCRIPTION OF THE DRAWINGS

The above objects and other objects, features and advantages of the present disclosure will be made clearer by the following detailed description, given referring to the appended drawings. In the drawings.

DETAILED DESCRIPTION OF THE PREFERRED EMBODIMENTS

PTL 1: JP 2016-147585 A

Figure 1:
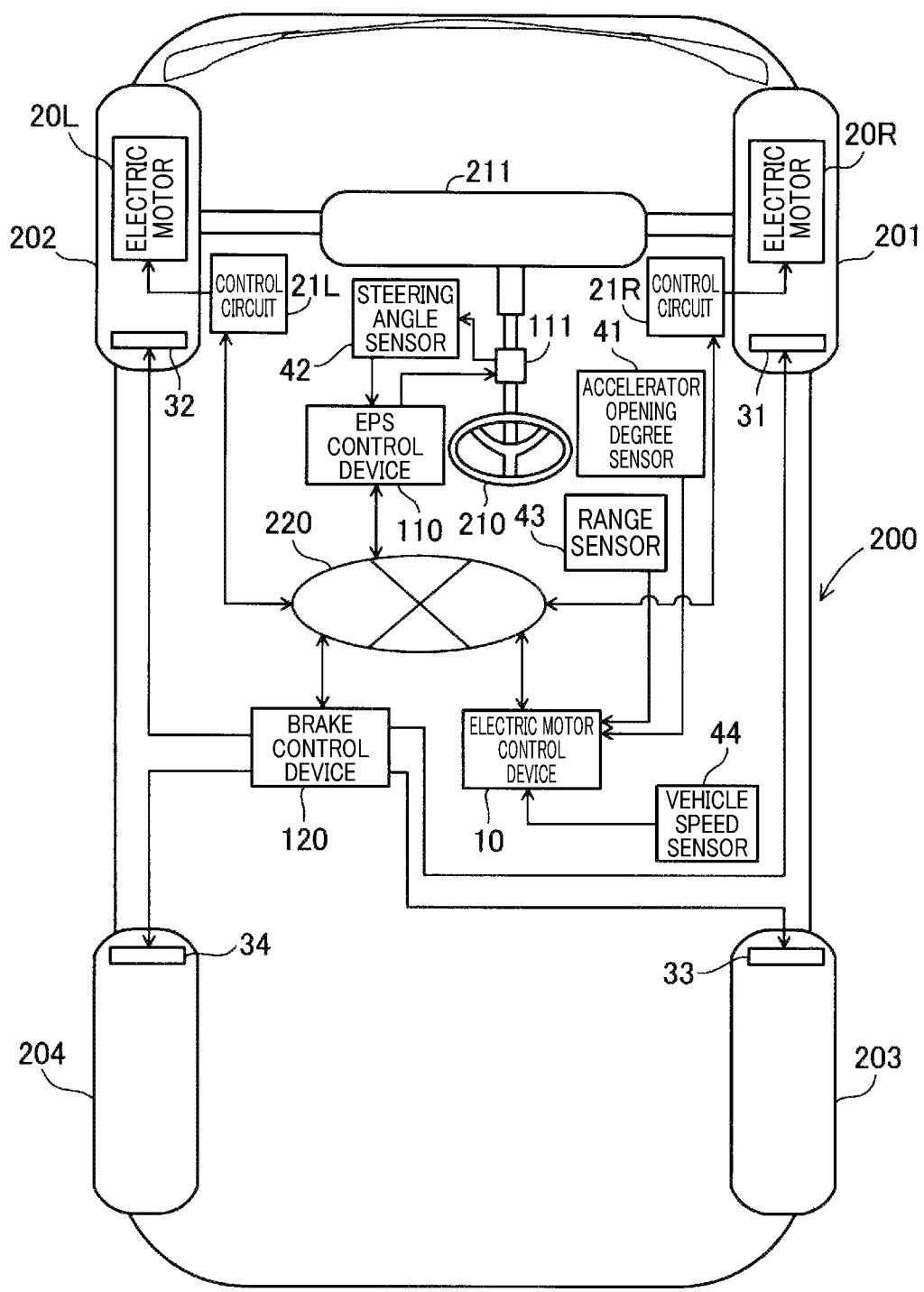
FIG. 1 is an explanatory diagram showing a schematic configuration of a vehicle equipped with an electric motor control device as an embodiment of the present disclosure.

In PTL 1, in a configuration that includes two electric motors for respectively driving a pair of left-side and right-side wheels and two control circuits for respectively controlling the corresponding one of the electric motors, if one of the two control circuits fails, there is a danger that the driving stability of the vehicle may be impaired. For example, a control circuit that is functioning normally might specify a torque for forward motion to the electric motor which it controls, while a control circuit in which a failure has occurred might specify a torque for reverse motion to the electric motor which it controls, and as a result there is a danger that the driving stability may be impaired, such that the vehicle spins. However until now, the measures that should be taken when one of the control circuits fails and fail-safe operation is implemented have not been studied sufficiently. For this reason there is a requirement, in a configuration that includes two electric motors for respectively driving two left-side and right-side wheels and two control circuits that respectively control the corresponding one of the electric motors, for a technology that can prevent driving instability of the vehicle when a failure occurs in the control circuits.

This disclosure can be realized in the following forms.

As one aspect of the present disclosure, an electric motor control device for controlling a right-side electric motor that drives a right-side wheel of a vehicle and a left-side electric motor that drives a left-side wheel of the vehicle is provided. The electric motor control device includes: a target torque setting unit configured to set target torque for each of a right-side control circuit that controls the right-side electric motor and a left-side control circuit that controls the left-side electric motor, and a failure occurrence determination unit configured to determine whether there is a failure occurrence in at least one of the right-side control circuit and the left-side control circuit, wherein: the target torque setting unit is configured to: set, in response to the failure occurrence determination unit determining that there is a failure occurrence in a failure control circuit that is one of the right-side control circuit and the left-side control circuit and there is a no failure occurrence in a normal control circuit that is the other of the right-side control circuit and the left-side control circuit, fail-safe torque as the target torque for the failure control circuit, the fail-safe torque being lower than a normal value of the target torque, the normal value of the target torque being a value of the target torque in a normal state in which the failure occurrence determination unit determining that there is no failure occurrence in each of the right-side control circuit and left-side control circuit, and set failure-time target torque as the target torque for the normal control circuit, the failure-time target torque being lower than the normal value of the target torque and being higher than the fail-safe torque.

According to this form of the disclosure, when the occurrence of a failure in one of the control circuits is identified, a fail-safe torque which is lower than the normal value of the target torque is instructed to the failure control circuit. It is thereby possible to prevent a large torque from being produced by the wheel that is controlled by the normal value of the target torque, and thereby enabling a decrease in the driving stability of the vehicle to be prevented. In addition a failure-time target torque, which is lower than the normal value of the target torque and higher than the fail-safe torque, is instructed to the normal control circuit, so that the difference between the values of output torque produced by the left-side and right-side wheels can be prevented from becoming large and thereby decreasing the driving stability of the vehicle.

The present disclosure can also be realized in various forms other than that of an electric motor control device. For example, it can be realized in the form of a vehicle provided with an electric motor control device, a computer program for realizing an electric motor control method, a storage medium for storing such a computer program, etc.

A. First Embodiment

A1. Device Configuration:

As shown in FIG. 1, the electric motor control device 10 of the present embodiment is installed in a vehicle 200 and controls the operation of a pair of front wheels 201 and 202 that constitute the drive wheels of the vehicle 200. The vehicle 200 is a four-wheeled vehicle that includes the above-mentioned pair of front wheels 201 and 202 and a pair of rear wheels 203 and 204 that are driven wheels, and two electric motors 20R and 20L that are driven by power supplied from a battery (not shown) which is installed on the vehicle 200 serve as a drive power source. The electric motors 20R and 20L are what is known as in-wheel electric motors, with the electric motor 20R being attached to the front wheel 201 and the electric motor 20L attached to the front wheel 202.

In addition to the above-mentioned electric motor control device 10, the pair of front wheels 201 and 202, the pair of rear wheels 203 and 204, and the two electric motors 20R and 20L, the vehicle 200 includes a brake control device 120 and four braking devices 31, 32, 33 and 34, an EPS (Electronic Power Steering) control device 110, an EPS actuator 111, two control circuits 21R, 21L, a steering wheel 210, a steering gear 211, an accelerator opening degree sensor 41, a steering sensor 42, a range sensor 43, and a vehicle speed sensor 44. The electric motor control device 10, the EPS control device 110, the two control circuits 21R and 21L, and the brake control device 120 are configured for communication with each other via an in-vehicle network 220. Any type of network such as a CAN (Controller Area Network), LIN (Local Interconnect Network), or Ethernet (registered trademark) may be used as the in-vehicle network 220.

The brake control device 120 controls the operation of the four braking devices 31 to 34. In the present embodiment, the brake control device 120 consists of an ECU (Electronic Control Unit) that includes a CPU, a ROM, and a RAM. The braking device 31 effects braking of the front wheel 201. The braking device 31 includes a brake rotor, brake pads, a hydraulic actuator for operating the brake pads, etc., and effects braking of the front wheel 201 in response to commands from the brake control device 120. Similarly, the braking device 32 brakes the front wheel 202, the braking device 33 brakes the rear wheel 203, and the braking device 34 brakes the rear wheel 204.

The EPS (Electronic Power Steering) control device 110 controls the operation of the EPS actuator 111. In the present embodiment, the EPS control device 110 consists of an ECU, and executes what is known as electric power steering. The EPS actuator 111 includes a fluid (oil), an oil pump for impelling the fluid, etc., and generates hydraulic pressure in response to a command from the EPS control device 110, for assisting the operation of the steering wheel 210.

The control circuit 21R is disposed corresponding to the front wheel 201, and controls the operation of the electric motor 20R. The electric motor 20R is a three-phase AC electric motor, and the control circuit 21R is provided with a driver IC (Integrated Circuit) (driver IC 22R described hereinafter) having an inverter that converts DC power supplied from a battery (not shown) into AC power and a switching element that controls the power supply voltage to the inverter by duty control. The control circuit 21L is disposed corresponding to the front wheel 202 and controls the operation of the electric motor 20L. As for the electric motor 20R, the electric motor 20L includes a driver IC (driver IC 22L described hereinafter). The detailed configuration of the control circuits 21R and 21L is described hereinafter.

The steering gear 211 transmits the movement of the steering wheel 210 to the pair of front wheels 201 and 202. The accelerator opening degree sensor 41 detects the degree of depression of an accelerator pedal (not shown) included in the vehicle 200, as the accelerator opening degree, that is, as the rotation angle of an electric motor that opens and closes a throttle valve.

The steering sensor 42 is electrically connected to the EPS actuator 111 by a dedicated cable, and uses a signal that is output in accordance with the operation of the EPS actuator 111 to detect the steering angle of the vehicle 200, set by the steering wheel 210. The steering sensor 42 is electrically connected to the EPS control device 110 by a dedicated cable, and notifies the EPS control device 110 of the detected steering angle. The range sensor 43 detects the shift range that is set by the shift lever (not shown) of the vehicle 200. The range sensor 43 is electrically connected to the electric motor control device 10 by a dedicated cable, and notifies the electric motor control device 10 of the detected shift range. The vehicle speed sensor 44 detects the rotation speeds of the respective wheels 201 to 204, and is electrically connected to the electric motor control device 10 by a dedicated cable. A vehicle speed signal that is output from the vehicle speed sensor 44 is a voltage whose value is proportional to the wheel speed, or a pulse wave that indicates an interval according to the wheel speed, and is supplied to the electric motor control device 10 via the dedicated cable.

Figure 2:
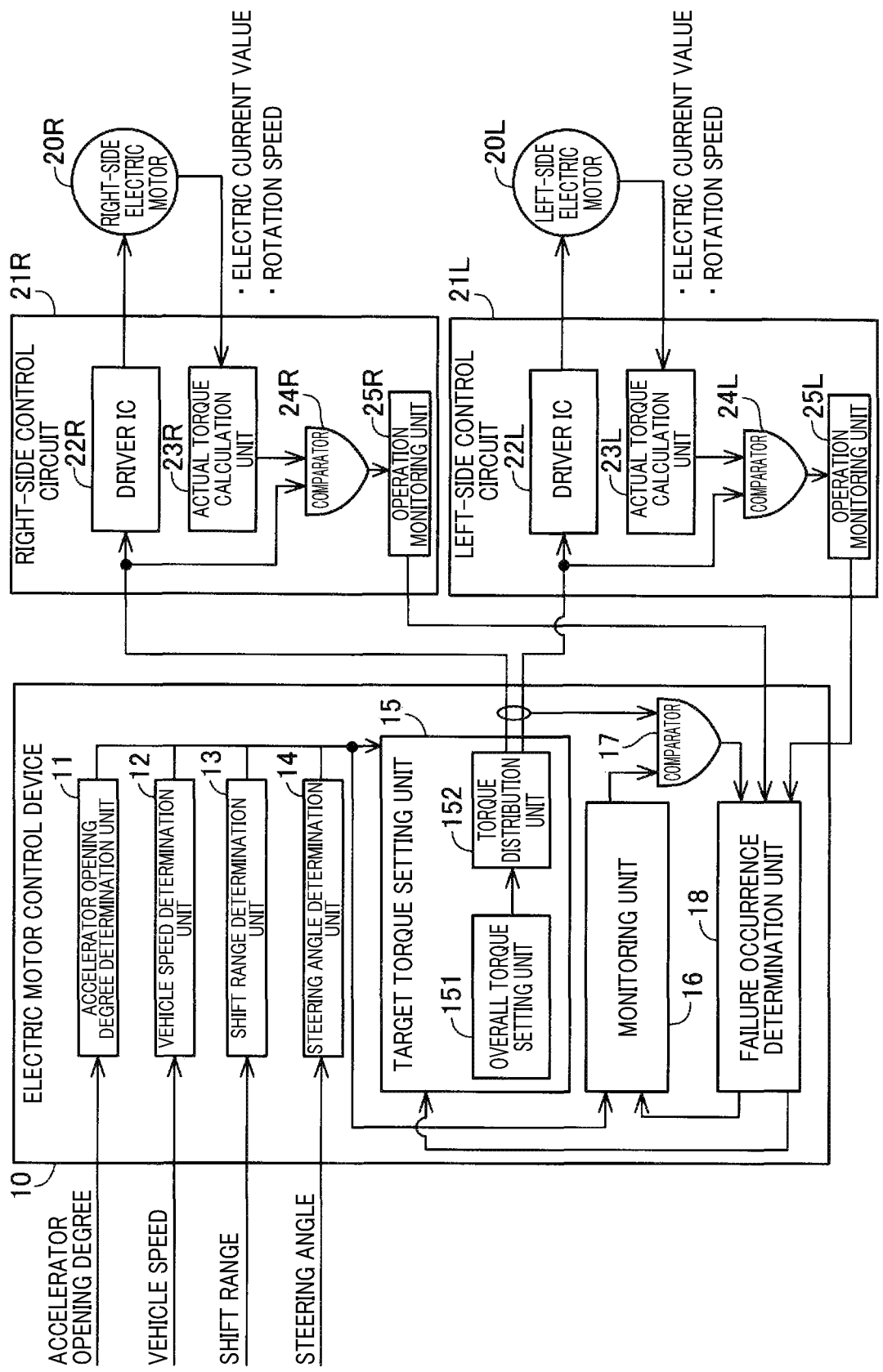
FIG. 2 is a block diagram showing a functional configuration of an electric motor control device and a control circuit.

As shown in FIG. 2, the electric motor control device 10 includes an accelerator opening degree determination unit 11, a vehicle speed determination unit 12, a shift range determination unit 13, a steering angle determination unit 14, a target torque setting unit 15, a monitoring unit 16, a comparator 17, and a failure occurrence determination unit 18. In the present embodiment the electric motor control device 10 consists of an ECU.

The accelerator opening degree determination unit 11 determines the accelerator opening degree by receiving from the accelerator opening degree sensor 41 a signal expressing the accelerator opening degree. The vehicle speed determination unit 12 determines the vehicle speed of the vehicle 200 by receiving from the vehicle speed sensor 44 a signal expressing the vehicle speed. The shift range determination unit 13 determines the shift range by receiving from the range sensor 43 a signal expressing the shift range. The steering angle determination unit 14 determines the steering angle by receiving from the steering sensor 42 a signal indicating the steering angle.

The target torque setting unit 15 determines the target torque, and supplies the target torque to the control circuits 21R and 21L. The target torque setting unit 15 includes an overall torque calculation unit 151 and a torque distribution unit 152.

Figure 3:
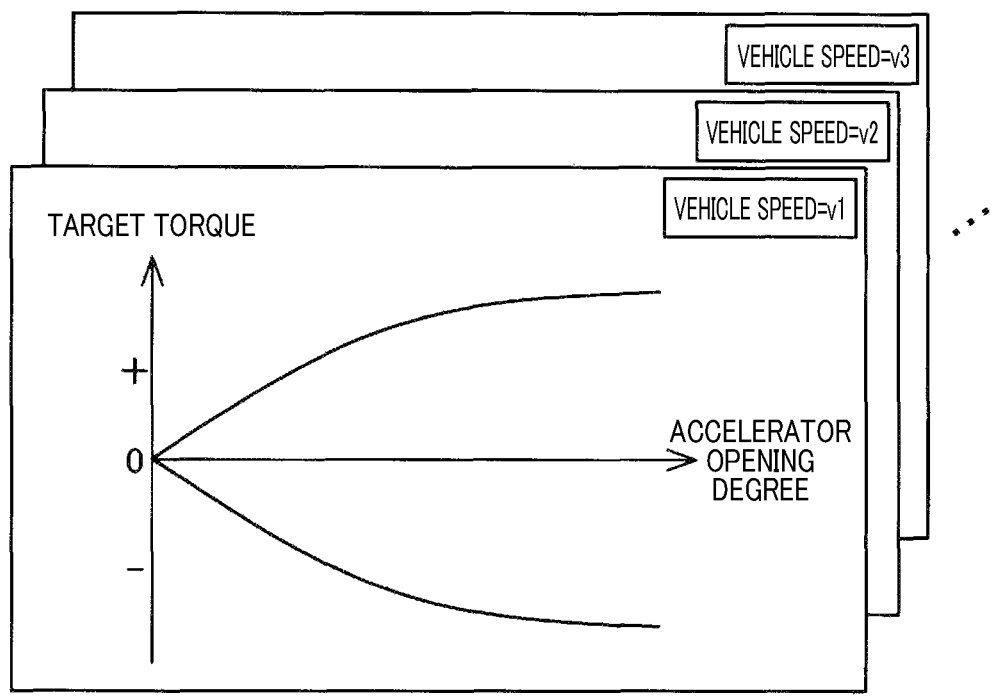
FIG. 3 is an explanatory diagram showing an example of the contents set in a torque map.

The overall torque calculation unit 151 calculates target torque that is to be output by the two electric motors 20R and 20L as a whole. Specifically, the overall torque calculation unit 151 calculates the target torque by referring to a torque map, as shown in FIG. 3, based on the accelerator opening degree determined by the accelerator opening degree determination unit 11, the vehicle speed determined by the vehicle speed determination unit 12, and the shift range determined by the shift range determination unit 13. In each of the torque maps, the accelerator opening degree associated with the target torque for each vehicle speed. The magnitude (absolute value) of the target torque is set to increase in accordance with increase in the magnitude of the accelerator opening degree. A positive value of the target torque signifies that the shift range is the drive (D) range, and a negative value signifies that the shift range is the reverse (R) range. It should be noted that although FIG. 3 shows only three maps, for values v1, v2, and v3 of the vehicle speed V, in the present embodiment four or more maps are prepared beforehand.

Figure 4:
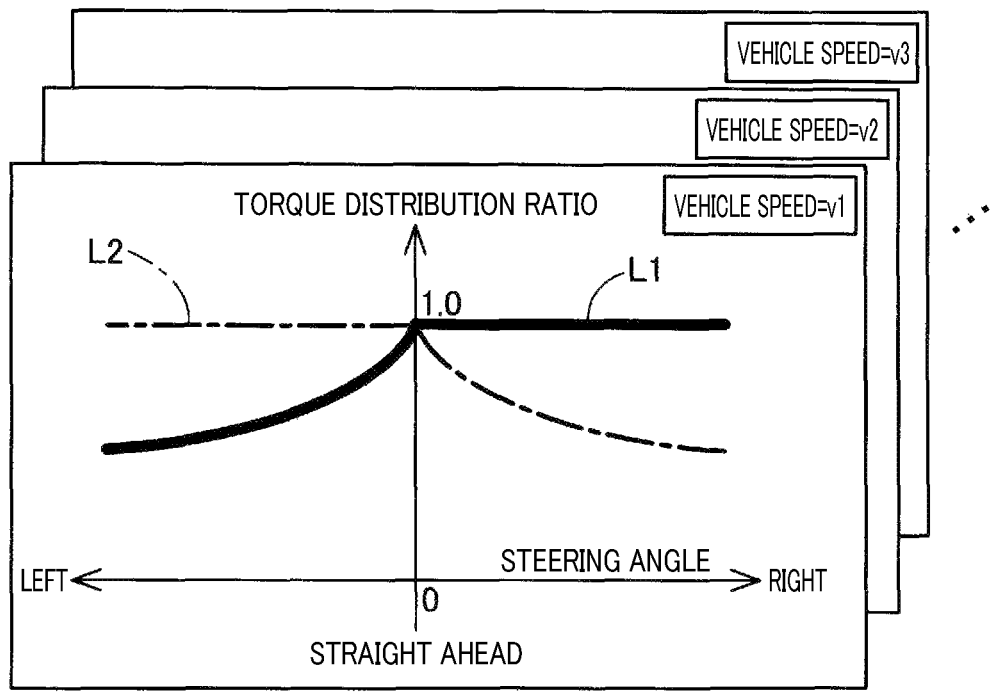
FIG. 4 is an explanatory diagram showing a torque distribution ratio determination map.

The torque distribution unit 152 shown in FIG. 2 determines the distribution ratio with which the torque calculated by the overall torque calculation unit 151 is to be distributed to the left-side and right-side electric motors 20R and 20L, and sets the target torque in accordance with the determined distribution ratio. The torque distribution unit 152 notifies to the two control circuits 21R and 21L and outputs to the comparator 17, signals expressing the target torque that are determined in accordance with the distribution ratio. The target torque distribution ratio is determined using a torque distribution ratio determination map, as shown in FIG. 4, based on the vehicle speed determined by the vehicle speed determination unit 12 and the steering angle determined by the steering angle determination unit 14. In each of the torque distribution ratio determination maps, the steering angle is associated with the torque distribution ratio for each vehicle speed. In FIG. 4, the target torque of the electric motor 20L is indicated by a thick solid line L1 and the target torque of the electric motor 20R is indicated by a thin solid line L2. For example, when the steering angle is 0°, that is, when the vehicle 200 is traveling straight ahead, the distribution ratio is set such that the target torque for the electric motor 20L and the target torque for the electric motor 20R are in the ratio 1:1. Furthermore, for example when the steering angle is set to some specific value for turning the vehicle to the right, the distribution ratio is determined such that the target torque s for the electric motor 20L and the target torque for the electric motor 20R is in the ratio 1:0.5, that is, 2:1. The reason for this is that, when turning to the right, it is necessary to output a larger torque to the electric motor 20L than to the electric motor 20R, for thereby rotating the front wheel 202 at a higher speed than the front wheel 201. It should be noted that although FIG. 4 shows only three maps, for values v1, v2, and v3 of the vehicle speed V, four or more maps are prepared beforehand in the present embodiment.

The monitoring unit 16 shown in FIG. 2 monitors for failure of the target torque setting unit 15. If the target torque setting unit 15 fails, an erroneous value may be calculated as the target torque to be output by the two electric motors 20R and 20L as a whole, or an erroneous distribution ratio may be calculated. Hence the monitoring unit 16 is provided in the electric motor control device 10 of the present embodiment, to monitor whether there is a failure in the target torque setting unit 15. The monitoring unit 16 has the same configuration as the target torque setting unit 15, determining the target torque to be output by the two electric motors 20R and 20L as a whole, and the distribution ratio with which that target torque is distributed to the left-side and right-side-side electric motors 20R and 20L. A signal expressing the target torque for the left-side and right-side-side electric motors 20R and 20L, determined in accordance with the distribution ratio, is output from the monitoring unit 16 to the comparator 17.

The comparator 17 receives the first signal expressing the target torque from the target torque setting unit 15 and the second signal from the monitoring unit 16, compares the target torque expressed by the first signal and the target torque expressed by the second signal, and notifies the comparison result, that is, the difference between the value of the target torque expressed by the first signal and the value of the target torque expressed by the second signal, to the failure occurrence determination unit 18.

The failure occurrence determination unit 18 determines whether there is a failure in the target torque setting unit 15 or the two control circuits 21R and 21L. Specifically, the failure occurrence determination unit 18 receives the difference between the values of the target torque from the comparator 17, and determines that there is a failure in the target torque setting unit 15 when that difference is equal to or greater than a predetermined threshold value. It should be noted that it would be equally possible for the failure occurrence determination unit 18 to determine that there is a failure in the target torque setting unit 15 when the magnitude (absolute value) of the target torque that is output from the target torque setting unit 15 is equal to or greater than a predetermined threshold value, when the shift range is the reverse (R) range.

In addition, when the failure occurrence determination unit 18 receives a signal indicating occurrence of a failure (hereinafter referred to as a "failure occurrence signal") from the control circuits 21R and 21L, the failure occurrence determination unit 18 determines that there is a failure occurrence in at least one of the two control circuits 21R and 21L. When the failure occurrence determination unit 18 determines that there is a failure occurrence as described above, the failure occurrence determination unit 18 notifies the signal expressing the failure occurrence to the target torque setting unit 15 and the monitoring unit 16. In an electric motor control process described hereinafter, the target torque setting unit 15 and the monitoring unit 16 having received notification of the failure occurrence notify, to the two control circuits 21R and 21L, the torque different from the target torque during normal operation when there is no failure occurrence (referred to in the following as the normal value of the target torque, described hereinafter), that is, the torque different from the target torque determined as described hereinabove is notified to the two control circuits 21R and 21L.

The control circuit 21R shown in FIG. 2 includes a driver IC 22R, an actual torque calculation unit 23R, a comparator 24R, and an operation monitoring unit 25R. The driver IC 22R supplies a drive voltage to the electric motor 20R in accordance with the target torque value notified from the torque distribution unit 152. The actual torque calculation unit 23R detects the value of the current flowing through the electric motor 20R and the rotation speed of the electric motor 20R, and based on the value of current and rotation speed, calculates the torque that is actually being output by the electric motor 20R (hereinafter, the "actual torque"). The value of target torque notified from the torque distribution unit 152 and the value of the actual torque calculated by the actual torque calculation unit 23R are input to the comparator 24R. The comparator 24R compares these two torque values input, and outputs the comparison result, that is, the torque difference, to the operation monitoring unit 25R. The operation monitoring unit 25R determines the operation of the driver IC 22R. Specifically, the operation monitoring unit 25R determines a failure of the driver IC 22R when the comparison result input from the comparator 24R is equal to or greater than a predetermined threshold value. In that case, the operation monitoring unit 25R notifies the failure occurrence to the electric motor control device 10 (failure occurrence determination unit 18), by output of a failure occurrence signal. If the comparison result is lower than the threshold value, then the driver IC 22R is operating normally, and the operation monitoring unit 25R does not output a failure occurrence signal.

The control circuit 21L has the same configuration as the control circuit 21R. That is, it includes a driver IC 22L, an actual torque calculation unit 23L, a comparator 24L, and an operation monitoring unit 25L. When the comparison result input from the comparator 24L is equal to or greater than a predetermined threshold value, the operation monitoring unit 25L determines that there is a failure in the driver IC 22L, notifying the electric motor control device 10 (failure occurrence determination unit 18) by output of a failure occurrence signal.

Figure 5:
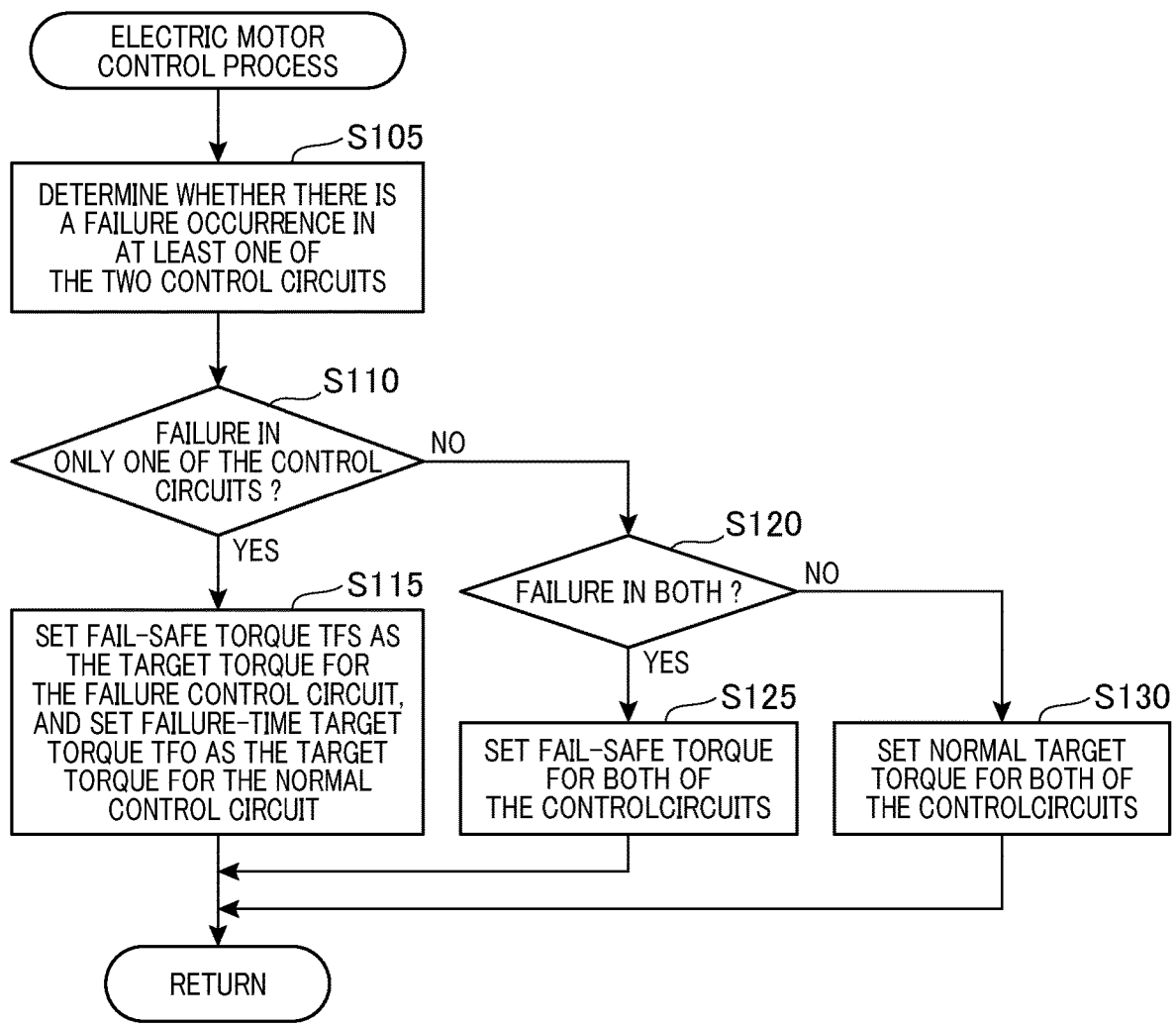
FIG. 5 is a flowchart showing an electric motor control process.

A2. Electric Motor Control Process:

The electric motor control process shown in FIG. 5 is executed when the start button of the vehicle 200 is pressed and power is supplied to the electric motor control device 10. The electric motor control process serves to control the two electric motors 20R and 20L, and in particular is a fail-safe process for responding safely when failure occurs in the electric motors 20R, 20L.

The failure occurrence determination unit 18 determines whether there is a failure occurrence in at least one of the two control circuits 21R and 21L (step S105). Specifically, the failure occurrence determination unit 18 determines that whether there is a failure occurrence in at least one of the control circuits 21R, 21L, by determining a failure occurrence signal is received from at least one of the control circuits 21R, 21L.

Based on the determination result obtained in step S105 (step S110), the failure occurrence determination unit 18 determines whether there is a failure in only one of the control circuits.

If it is determined that there is a failure in only one of the control circuits (step S110: YES), the failure occurrence determination unit 18 notifies the target torque setting unit 15 and the monitoring unit 16 that only one of the control circuits has failed. The target torque setting unit 15 sets a fail-safe torque Tfs as the target torque for the control circuit in which the failure occurrence determination unit determining that there is a failure occurrence (hereinafter referred to as the "failure control circuit"), and sets a failure-time target torque Tfo as the target torque for the control circuit in which the failure occurrence determination unit determining that there is no failure occurrence (hereinafter referred to as the "normal control circuit" (step S115). The fail-safe torque Tfs is set as a predetermined value, which in this embodiment is zero. The fail-safe torque Tfs is not limited to a value of zero, and may be set to an arbitrary value that is smaller than that of the failure-time target torque Tfo.

The failure-time target torque Tfo will be described with reference to FIG. 6. The target torque setting unit 15 sets a torque reduction ratio, with reference to a torque reduction ratio map which is set beforehand in the electric motor control device 10 based on the vehicle speed and the steering angle. The target torque setting unit 15 calculates the failure-time target torque Tfo by multiplying the target torque (hereinafter referred to as the "normal value of the target torque") by the set torque reduction ratio, the target torque being a torque set for the control circuit in which there is no failure occurrence, and the target torque being determined based on the determined accelerator opening, vehicle speed, and shift range.

Figure 6:
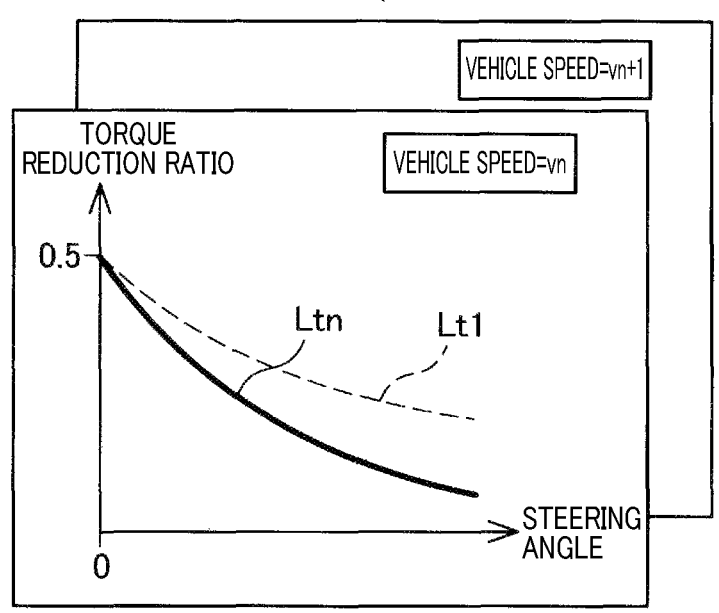
FIG. 6 is an explanatory diagram showing an example of the contents set in a torque reduction ratio map in a first embodiment.
Figure 6:
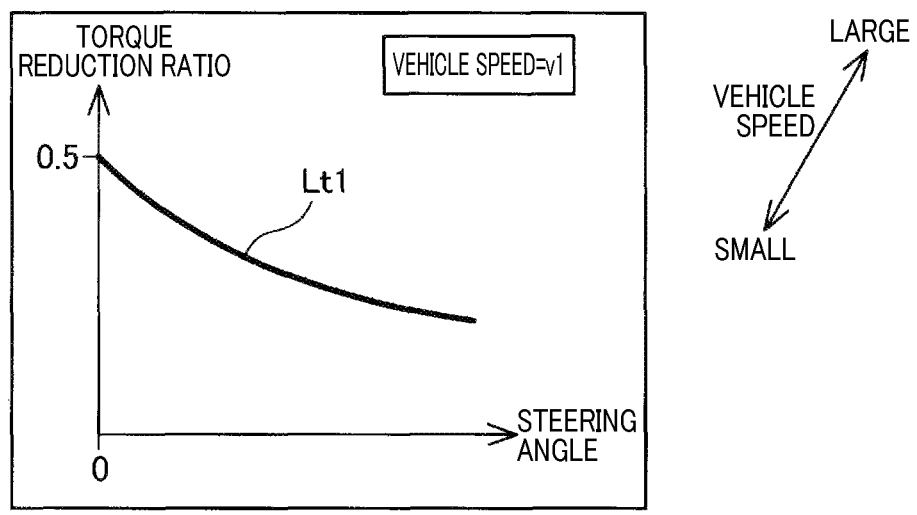

Each of the torque reduction ratio maps shown in FIG. 6 associates the steering angle with the torque reduction ratio for each vehicle speed. In FIG. 6, the horizontal axis represents absolute values of steering angle and the vertical axis represents values of torque reduction ratio. When the vehicle speed V is v1, the torque reduction ratio map is set as the curve Lt1, such that when the steering angle is zero the torque reduction ratio is 0.5, and such that as the absolute value of the steering angle increases, the torque reduction ratio gradually decreases. In a torque reduction ratio map Ltn when the vehicle speed V is the vehicle speed vn which is greater than v1, when the steering angle is zero, the torque reduction ratio remains set at 0.5, i.e., the same as for the torque reduction ratio map Lt1. In the torque reduction ratio map Ltn, as for the torque reduction ratio map Lt1, the torque reduction ratio is set to gradually decrease as the absolute value of the steering angle increases. In the torque reduction ratio map Ltn which corresponds to a vehicle speed V of vn, the torque reduction ratio map Lt1 is represented in broken-line form for ease of comparison.

In the present embodiment, as can be understood by comparing the torque reduction ratio map Ltn shown by a solid line and the torque reduction ratio map Lt1 shown by a broken line in FIG. 6, for the same absolute value of the steering angle, the higher the vehicle speed the smaller is the value of torque reduction ratio that is set. Hence, for the same absolute value of the steering angle, the higher the vehicle speed, the smaller becomes the value of torque that is set for the normal control circuit as the target torque. In that way with the present embodiment, the greater the absolute value of the steering angle and the higher the vehicle speed, the smaller becomes the torque reduction ratio and the smaller becomes the value of torque that is set as the failure-time target torque Tfo. If only one of the control circuits has failed, then since the fail-safe torque Tfs is zero, the output of the electric motor corresponding to the failure control circuit becomes zero, and only the electric motor corresponding to the normal control circuit will operate to drive a wheel. In such a situation, if the steering angle is large, that is, for example, if the vehicle 200 is traveling on a curve, the operation of the vehicle 200 may become unstable, since only one wheel is rotated. Hence in this case, the electric motor control device 10 of the present embodiment sets a small value for the target torque that is set for the normal control circuit and the corresponding controlled wheel rotates only slowly, to thereby prevent deterioration of the driving stability.

Furthermore, as the vehicle speed increases, the stability during single-wheel travel decreases. Hence in this case too, the electric motor control device 10 of the present embodiment sets a small value of target torque for the normal control circuit and the corresponding wheel rotates only slowly, to thereby prevent deterioration of driving stability.

As shown in FIG. 6, even when the steering angle is zero, that is, when the vehicle 200 travels in a straight line, the torque reduction ratio is set to 0.5, so that only half of the normal value of the target torque is set for the normal control circuit, as the target torque. The reason for this is that, if one of the control circuits has failed and the vehicle is being driven by only one of the drive wheels, a smaller torque is output than in the normal state, to thereby prevent the driving stability of the vehicle 200 from deteriorating when traveling straight ahead.

As shown in FIG. 5, if it is not determined that there is a failure in only one of the control circuits in step S110 (step S110: NO), the failure occurrence determination unit 18 determines whether both control circuits have failed. (Step S120). If it is determined that both control circuits have failed (step S120: YES), the target torque setting unit 15 sets the fail-safe torque as the target torque for both the control circuits 21R and 21L. (Step S125). On the other hand, if it is determined that no failure has occurred in either of the control circuits 21R and 21L (step S120: NO), the target torque setting unit 15 sets the normal value of the target torque as the target torque for each of the control circuits 21R and 21L (step S130).

According to the electric motor control device 10 of the first embodiment described above, if it is determined that there is a failure occurrence in at least one of the two control circuits 21R and 21L, fail-safe torque which is lower than the normal value of the target torque is set for the failure control circuit. The generation of a large torque by the wheel that is controlled by the failure control circuit can thereby be prevented, and as a result, deterioration of the driving stability of the vehicle can be prevented. In addition, a failure-time target torque which is lower than the normal value of the target torque and is higher than the fail-safe torque, is set for the normal control circuit, thereby preventing the difference between the output torque values of the left-side and right-side wheels from becoming large and enabling deterioration of the driving stability to be prevented.

Furthermore when the steering angle is large, the target torque setting unit 15 sets, as a value of a failure-time target torque, for the normal control circuit, a value smaller than a value of a torque when the steering angle is small. Hence when the steering angle is large and deterioration of the driving stability can readily occur, such deterioration can also be prevented.

Furthermore, when the vehicle speed is high, the target torque setting unit 15 sets, as a value of the failure-time target torque, for the normal control circuit, a value smaller than the value of a torque when the vehicle speed is low. Hence when the vehicle speed is high and deterioration of the driving stability can readily occur, such deterioration can also be prevented.

Furthermore, since the target torque setting unit is configured to set, as the failure-time target torque for the normal control circuit, a torque that is a predetermined proportion of the normal value of the target torque, the processing load imposed on the electric motor control device 10 in calculating the value of the failure-time target torque can be reduced.

Furthermore, since a value of the fail-safe torque is zero, the output of torque that is based on erroneous instruction from the failure control circuit can be prevented, making it is possible to further prevent deterioration of the driving stability.

Furthermore, a value of output torque of the corresponding controlled one of electric motors 20R and 20L is calculated by using the acquired value of the current and the acquired value of the rotation speed. When the torque difference between the calculated output torque and the target torque is greater than a predetermined threshold value, it is determined that a failure has occurred. If a value of the torque difference is less than the threshold value, it is determined that no failure has occurred. Hence it can be accurately determined whether there is a failure occurrence.

B. Second Embodiment

Since the configuration of the electric motor control device 10 of the second embodiment is the same as for the electric motor control device 10 of the first embodiment, those components that are the same in both are designated by the same reference numerals as for the first embodiment, and detailed description of these is omitted. Furthermore, the procedure of the electric motor control process of the second embodiment is the same as that of the first embodiment. The electric motor control device 10 of the second embodiment differs from that of the first embodiment with respect to the contents that are set in the torque reduction ratio maps.

Figure 7:
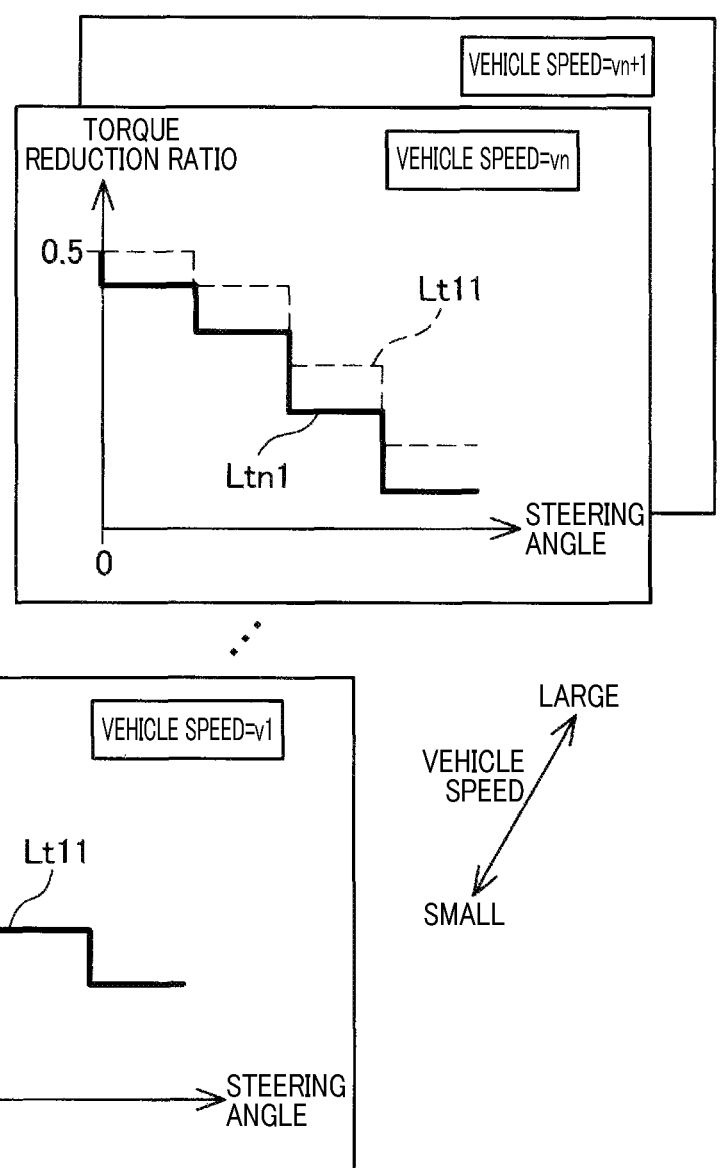
FIG. 7 is an explanatory diagram showing an example of the contents set in a torque reduction ratio map in a second embodiment.

In the torque reduction ratio maps of the first embodiment, as shown in FIG. 6, the torque reduction ratio is set to gradually decrease as the absolute value of the steering angle increases. On the other hand as shown in FIG. 7, in torque reduction ratio maps of the second embodiment, for example the torque reduction ratio map Lt11 corresponding to a vehicle speed V of v1, the map is set such that the torque reduction ratio decreases in a stepwise manner as the absolute value of the steering angle increases. The torque reduction ratio map Lt11 is shown in broken-line form together with the torque reduction ratio map Ltn1, in which the corresponding value vn of the vehicle speed V is higher than v1. In the second embodiment also, for the same absolute value of the steering angle, the higher the vehicle speed the smaller becomes the torque reduction ratio.

The electric motor control device 10 of the second embodiment described above provides the same effects as those of the electric motor control device 10 of the first embodiment. As can be understood from the first and second embodiments, the electric motor control circuit of the present disclosure may use an arbitrary configuration in which in response to the steering angle being large, as a value of the failure-time target torque, a value smaller than a value of a torque when the steering angle is small is set for the normal control circuit.

C. Third Embodiment

Since the configuration of the electric motor control device 10 of the third embodiment is the same as that of the first embodiment, those components that are the same are designated by the same reference numerals as for the first embodiment, and detailed description of these is omitted. Furthermore, the procedure of the electric motor control process of the third embodiment is the same as that of the first embodiment. The electric motor control device 10 of the third embodiment differs from electric motor control device 10 of the first embodiment with respect to the contents that are set in the torque reduction ratio maps.

Figure 8:
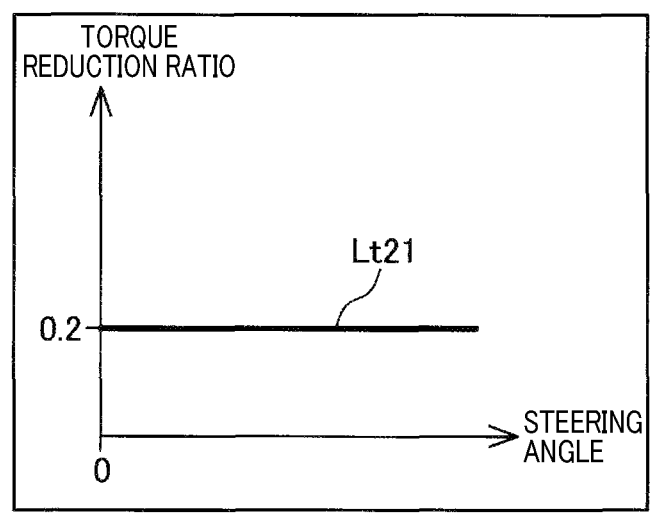
FIG. 8 is an explanatory diagram showing an example of the contents set in a torque reduction ratio map in a third embodiment.

In torque reduction ratio maps of the first embodiment, as shown in FIG. 6, the torque reduction ratio is set to gradually decrease as the absolute value of the steering angle increases. In addition, the torque reduction ratio is set to gradually decrease as the vehicle speed increases. On the other hand in the torque reduction ratio map Lt21 of the third embodiment, as shown in FIG. 8, the torque reduction ratio is set at a fixed value of 0.2, irrespective of the magnitudes of the steering angle and vehicle speed. It should be noted that the fixed value is not limited to 0.2, and may be set to any value smaller than 1.

The electric motor control device 10 of the third embodiment described above provides the same effects as those of the electric motor control device 10 of the first embodiment. That is, when there is a failure occurrence, a value of torque that is smaller than the normal value of the target torque is set for the normal control circuit as the target torque, thereby enabling a decrease in the driving stability of the vehicle 200 to be prevented.

D. Other Embodiments (D1) In each of the above embodiments, failure of a control circuit 21R or 21L signifies failure of a driver IC 22R or 22L, however the present disclosure is not limited to this. For example, failure of a control circuit 21R or 21L may consist of a failure of any component constituting the control circuit such as an actual torque calculation unit 23R or 23L, a comparator 24R or 24L, or an operation monitoring unit 25R or 25L. For example, a configuration may be used whereby each of the two control circuits 21R and 21L is configured to periodically notify the electric motor control device 10 as to whether that control circuit is operating normally, and whereby when an abnormality is notified in such communication or when such a notification does not arrive, a failure occurrence in the circuits 21R, 21L is determined. With such a configuration, the electric motor control device 10 can determine not only failure of a driver IC 22R or IC 22L but also failure of any of the components constituting the control circuits 21R and 21L.

(D2) In the first and second embodiments, in response to the steering angle being large, as a value of the failure-time target torque, a value smaller than a value of a torque when the steering angle is small is set for the normal control circuit, and in response to the vehicle speed is high, as a value of the failure-time target torque, a value smaller than the value of a torque when the vehicle speed is low is set for the normal control circuit. However the present disclosure is not limited to this. It would be equally possible to use a configuration in which in response to the steering angle being large, as a value of the failure-time target torque, a value smaller than a value of a torque when the steering angle is small is set for the normal control circuit, or in response to the vehicle speed is high, as a value of the failure-time target torque, a value smaller than the value of a torque when the vehicle speed is low is set for the normal control circuit.

(D3) In each of the above embodiments, the value of failure-time target torque Tfo is calculated with reference to a torque reduction ratio map, however the present disclosure is not limited to this. For example, it would be equally possible for the failure-time target torque Tfo to be determined with reference to maps in which respective values of target torque (failure-time target torque) are set beforehand according to vehicle speed, steering angle, accelerator opening degree and shift range. Furthermore in the third embodiment, it would be equally possible for a fixed value to be set beforehand as the failure-time target torque Tfo. Moreover, instead of referring to a map, it would be equally possible for the failure-time target torque Tfo to be determined by calculation, using a predetermined equation.

(D4) In each of the above embodiments, when there is a failure occurrence in at least one of the control circuits 21R, 21L while the vehicle 200 is running, a fail-safe torque is immediately set for the failure control circuit and a failure-time target torque Tfo is set for the normal control circuit, as respective target torque values. However the present disclosure is not limited to this. For example, if there is a failure occurrence in at least one of the control circuits 21R, 21L when the vehicle 200 is running, then firstly the fail-safe torque Tfs may be set as the target torque value for both of the control circuits 21R and 21L, then when the vehicle 200 is running after the vehicle 200 stopped or was running below a predetermined vehicle speed, the fail-safe torque Tfs may be set for only the failure control circuit as the target torque value, while the failure-time target torque Tfo may be set for the normal control circuit.

(D5) In each of the above embodiments the drive wheels of the vehicle 200 are a pair of front wheels 201 and 202. However it is equally possible for the pair of rear wheels 203, 204 to be drive wheels instead of, or in addition to, the pair of front wheels 201 and 202. In such a configuration, electric motors are attached to respective ones of the pair of rear wheels 203 and 204, and control circuits corresponding to the respective electric motors are installed.

(D6) In each of the above embodiments, the operation of the corresponding one of an electric motor 20R and 20L is halted, by setting a value of zero as the fail-safe torque Tfs for the failure control circuit. However the present disclosure is not limited to this. For example the operation of the corresponding one of an electric motor 20R and 20L may be halted, by disconnecting a relay that is provided in the power supply circuit for connecting the failure control circuit to the battery, and thereby interrupting the supply of power from the battery to the failure control circuit.

(D7) In each of the above embodiments, at least one of the two electric motors 20R and 20L may be an electric motor generator. In such a configuration, the electric motor generator corresponds to a specific concept of an electric motor in the present disclosure.

(D8) The electric motor control device 10 and the method of operation thereof, described in the present disclosure, may be realized by a dedicated computer provided with a processor and memory programmed to perform one or more functions embodied in a computer program. Alternatively, the electric motor control device 10 and the method of operation thereof, described in the present disclosure, may be realized by a dedicated computer having a processor configured with one or more dedicated hardware logic circuits. Alternatively, the electric motor control device 10 and the method of operation thereof, described in the present disclosure, may be realized by one or more dedicated computers, each dedicated computer is provided with a combination of a processor and memory programmed to perform one or more functions embodied in a computer program and a processor configured with one or more hardware logic circuits. Furthermore, the computer program may be stored in a computer-readable non-transitory tangible recording medium as instructions to be executed by the computer.

The present disclosure is not limited to the above-described embodiments, and may be realized by various configurations which are within a range that does not deviate from the gist of the disclosure. For example, technical features corresponding to the technical features in the respective embodiments, described in the summary of the invention, may be replaced or combined, as appropriate, to solve some or all of the above-mentioned problems or to realize some or all of the above-mentioned effects. Furthermore, technical features that are not described as essential in the present specification may be deleted, as appropriate.

What is claimed is:

1. An electric motor control device for controlling a right-side electric motor that drives a right-side wheel of a vehicle and a left-side electric motor that drives a left-side wheel of the vehicle, the electric motor control device comprising:
    a target torque setting unit configured to set target torque for each of a right-side control circuit that controls the right-side electric motor and a left-side control circuit that controls the left-side electric motor; and
    a failure occurrence determination unit configured to determine, based on information indicative of presence or absence of a failure occurrence received from the right-side control circuit and the left-side control circuit, whether there is a failure occurrence in at least one of the right-side control circuit and the left-side control circuit, wherein:
    the target torque setting unit is further configured to:
        set, in response to the failure occurrence determination unit determining that there is a failure occurrence in a failure control circuit, which is one of the right-side control circuit and the left-side control circuit, and there is no failure occurrence in a normal control circuit, which is the other of the right-side control circuit and the left-side control circuit, fail-safe torque as the target torque for the failure control circuit, the fail-safe torque being lower than a normal value of the target torque, the normal value of the target torque being a value of the target torque in a normal state in which the failure occurrence determination unit determines that there is no failure occurrence in each of the right-side control circuit and left-side control circuit; and
        set failure-time target torque as the target torque for the normal control circuit, the failure-time target torque being lower than the normal value of the target torque and being higher than the fail-safe torque;
    the right-side control circuit and the left-side control circuit each have an operation monitoring unit; and
    each the operation monitoring units is configured to:
        acquire a value of a current and a value of a rotation speed of the corresponding controlled one of the right-side electric motor and the left-side electric motor;
        calculate a value of output torque of the corresponding controlled electric motor using the acquired value of the current and the acquired value of the rotation speed;
        calculate a torque difference between the calculated output torque and the target torque set by the target torque setting unit;
        determine that a failure has occurred in response to a value of the torque difference being larger than a predetermined threshold value; and
        determine that no failure has occurred in response to the value of the torque difference being less than the threshold value.

2. The electric motor control device according to claim 1, further comprising a steering angle determination unit configured to determine a steering angle of the vehicle, wherein
    the target torque setting unit is configured to set, in response to the steering angle being large and as a value of the failure-time target torque for the normal control circuit, a value smaller than a value of a torque when the steering angle is small.

3. The electric motor control device according to claim 1, further comprising a vehicle speed determination unit configured to determine a vehicle speed of the vehicle, wherein
    the target torque setting unit is configured to set, in response to the vehicle speed being high and as a value of the failure-time target torque for the normal control circuit, a value smaller than a value of a torque when the vehicle speed is low.

4. The electric motor control device according to claim 1, wherein the target torque setting unit is configured to set, as the failure-time target torque for the normal control circuit, a torque that is a predetermined proportion of the normal value of the target torque.

5. The electric motor control device according to claim 1, wherein a value of the fail-safe torque is zero.

6. A control method using an electric motor control device to control a right-side electric motor that drives a right-side wheel of a vehicle and a left-side electric motor that drives a left-side wheel of the vehicle, the control method comprising:
    determining, based on information indicative of presence or absence of a failure occurrence received from a right-side control circuit controlling the right-side electric motor and a left-side control circuit controlling the left-side electric motor, whether there is a failure occurrence in the right-side control circuit or the left-side control circuit; and
    in response to determining a failure occurrence in one of the right-side control circuit and left-side control circuit, the one in which the failure occurrence having been determined being a failure-determined control circuit, and the one in which the failure occurrence failing to have been determined being a normal control circuit,
        setting a fail-safe torque as a target torque to the failure-determined control circuit, and
        setting a failure-time target torque to the normal control circuit, a value of the failure-time target torque being lower than a normal target torque value and being higher than the fail-safe torque, the normal target torque being a target torque in a normal state in which no failure is determined for either of the right-side control circuit and left-side control circuit, wherein:
    the right-side control circuit and the left-side control circuit each have an operation monitoring unit; and
    each of the operation monitoring units is configure to:
        acquire a value of a current and a value of a rotation speed of the corresponding controlled one of the tight-side electric motor and the left-side electric motor;

calculate a value of output torque of the corresponding controlled electric motor using the acquired value of the current and the acquired value of the rotation speed;

calculate a torque difference between the calculated output torque and the set target torque;

determine that a failure has occurred in response to a value of the torque difference being larger than a predetermined threshold value; and determine that no failure has occurred in response to the value of the torque difference being less than the threshold value.

7. An electric motor control device for controlling a right-side electric motor that drives a right-side wheel of a vehicle and a left-side electric motor that drives a left-side wheel of the vehicle, the electric motor control device comprising a processor programmed to:

set target torque for each of a right-side control circuit that controls the right-side electric motor and a left-side control circuit that controls the left-side electric motor; and determine, based on information indicative of presence or absence of a failure occurrence received from the right-side control circuit and the left-side control circuit, whether there is a failure occurrence in at least one of the right-side control circuit and the left-side control circuit, wherein:

the processor is further programmed to:

set, in response to determining that there is a failure occurrence in a failure control circuit, which is one of the right-side control circuit and the left-side control circuit, and there is no failure occurrence in a normal control circuit, which is the other of the right-side control circuit and the left-side control circuit, fail-safe torque as the target torque for the failure control circuit, the fail-safe torque being lower than a normal value of the target torque, the normal value of the target torque being a value of the target torque in a normal state in which it is determined that there is no failure occurrence in each of the right-side control circuit and left-side control circuit; and set failure-time target torque as the target torque for the normal control circuit, the failure-time target torque being lower than the normal value of the target torque and being higher than the fail-safe torque;

the right-side control circuit and the left-side control circuit each have an operation monitoring unit; and each of the operation monitoring units is configured to:

acquire a value of a current and a value of a rotation speed of the corresponding controlled one of the right-side electric motor and the left-side electric motor;

calculate a value of output torque of the corresponding controlled electric motor using the acquired value of the current and the acquired value of the rotation speed;

calculate a torque difference between the calculated output torque and the target torque set by the processor;

determine that a failure has occurred in response to a value of the torque difference being larger than a predetermined threshold value; and determine that no failure has occurred in response to the value of the torque difference being less than the threshold value.

8. The electric motor control device according to claim 7, wherein the processor is further programmed to:

determine a steering angle of the vehicle; and set, in response to the steering angle being large and as a value of the failure-time target torque for the normal control circuit, a value smaller than a value of a torque when the steering angle is small.

9. The electric motor control device according to claim 7, wherein the processor is further programmed to:

determine a vehicle speed of the vehicle; and set, in response to the vehicle speed being high and as a value of the failure-time target torque for the normal control circuit, a value smaller than a value of a torque when the vehicle speed is low.

10. The electric motor control device according to claim 7, wherein the processor is further programmed to set, as the failure-time target torque for the normal control circuit, a torque that is a predetermined proportion of the normal value of the target torque.

11. The electric motor control device according to claim 7, wherein a value of the fail-safe torque is zero.

* * * * *